United States Patent
Sakai

(10) Patent No.: US 12,374,751 B2
(45) Date of Patent: *Jul. 29, 2025

(54) POWER STORAGE CELL AND POWER STORAGE DEVICE

(71) Applicant: TOYOTA JIDOSHA KABUSHIKI KAISHA, Toyota (JP)

(72) Inventor: Yasuhiko Sakai, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,115

(22) Filed: Dec. 12, 2023

(65) Prior Publication Data

US 2024/0113379 A1 Apr. 4, 2024

Related U.S. Application Data

(63) Continuation of application No. 17/227,475, filed on Apr. 12, 2021, now Pat. No. 11,876,244.

(30) Foreign Application Priority Data

Apr. 20, 2020 (JP) .................. 2020-074905

(51) Int. Cl.
*H01M 50/30* (2021.01)
*H01M 10/0525* (2010.01)
(Continued)

(52) U.S. Cl.
CPC ....... *H01M 50/30* (2021.01); *H01M 10/0525* (2013.01); *H01M 10/0587* (2013.01); *H01M 50/209* (2021.01)

(58) Field of Classification Search
CPC .............. H01M 50/30; H01M 50/209; H01M 10/0525; H01M 10/0587
(Continued)

(56) References Cited

U.S. PATENT DOCUMENTS

| | | |
|---|---|---|
| 2013/0216879 A1 | 8/2013 | Egawa et al. |
| 2017/0084894 A1 | 3/2017 | Freiman et al. |
| 2018/0097207 A1* | 4/2018 | Unno .................... H01M 50/15 |

FOREIGN PATENT DOCUMENTS

| | | |
|---|---|---|
| CN | 106935759 A | 7/2017 |
| DE | 10 2012 222 111 A1 | 6/2014 |

(Continued)

OTHER PUBLICATIONS

English language machine translation of "Lithium-Ion Secondary Battery ad Battery Pack" by Sawada Keisuke et all. in JP2012-009317 (Year: 2012).*

(Continued)

*Primary Examiner* — Niki Bakhtiari
*Assistant Examiner* — Omar M Kekia
(74) *Attorney, Agent, or Firm* — Oliff PLC

(57) ABSTRACT

A electrode body of a power storage cell is accommodated in an inner space of a housing to form an upper clearance on a side opposite to a bottom surface of the housing and form a side clearance between the electrode body and each of a first side surface and a second side surface of the housing. Gas discharge valves include a first discharge valve provided on the first side surface and a second discharge valve provided on the second side surface. At least a portion of an opening of the first discharge valve is located at a region of the first side surface to which the upper clearance is projected, and at least a portion of an opening of the second discharge valve is located at a region of the second side surface to which the upper clearance is projected.

8 Claims, 4 Drawing Sheets

(51) Int. Cl.
*H01M 10/0587* (2010.01)
*H01M 50/209* (2021.01)

(58) Field of Classification Search
USPC .......................................................... 429/82
See application file for complete search history.

(56) References Cited

FOREIGN PATENT DOCUMENTS

| | | | |
|---|---|---|---|
| JP | 2003-178740 A | 6/2003 | |
| JP | 4486284 B2 | 6/2010 | |
| JP | 2012-009317 A | 1/2012 | |
| JP | 2012009317 * | 1/2012 | ............. Y02E 60/10 |
| JP | 2012-109126 A | 6/2012 | |
| JP | 2013-171733 A | 9/2013 | |
| JP | 2016-115437 A | 6/2016 | |
| JP | 2018-125109 A | 8/2018 | |

OTHER PUBLICATIONS

May 9, 2023 Office Action issued in U.S. Appl. No. 17/227,475.
Sep. 13, 2023 Notice of Allowance issued in U.S. Appl. No. 17/227,475.
Oct. 26, 2022 Office Action issued in U.S. Appl. No. 17/227,475.

* cited by examiner

POWER STORAGE CELL AND POWER STORAGE DEVICE

This application is a continuation of U.S. application Ser. No. 17/227,475 filed Apr. 12, 2021, which claims the benefit of Japanese Patent Application No. 2020-074905 filed on Apr. 20, 2020, the entire contents of which are hereby incorporated by reference.

BACKGROUND

Field

The present disclosure relates to a power storage cell and a power storage device.

Description of the Background Art

Japanese Patent Laying-Open No. 2012-9317 discloses a secondary battery in which gas discharge valves are provided on both side surfaces of a battery container. In Japanese Patent Laying-Open No. 2012-9317, the gas discharge valve is provided in a region in which the openings provided at the upper and lower end portions of the electrode body are projected onto the side surface of the battery container.

Japanese Patent Laying-Open No. 2013-171733 discloses a secondary battery in which a gas release valve is provided on an upper lid of a battery container. In the secondary battery described in Japanese Patent Laying-Open No. 2012-9317, when the electrode body is positioned closer to one side surface side due to an external impact or the like, the electrode body may overlap the gas discharge valve, and the opening of the gas discharge valve may be blocked.

In the secondary battery described in Japanese Patent Laying-Open No. 2013-171733, when the electrode body is raised upward due to gas pressure or the like inside the battery container, the opening of the gas release valve provided in the lid may be blocked by the electrode body. Thus, in the secondary batteries described in Japanese Patent Laying-Open No. 2012-9317 and Japanese Patent Laying-Open No. 2013-171733, gas discharge from the housing may not always be performed stably.

SUMMARY

An object of the present disclosure is to provide a power storage cell and a power storage device to stably discharge gas from a housing.

A power storage cell according to the present disclosure includes: a housing including a bottom surface and a side surface and defining an inner space; an electrode body accommodated in the inner space of the housing; and a gas discharge valve provided on the side surface of the housing.

In one embodiment, the bottom surface of the housing has a first width along a first direction and a second width along a second direction, the second width being smaller than the first width. The side surface of the housing includes a first side surface and a second side surface that are respectively located at ends of the housing in the first direction. The electrode body is accommodated in the inner space to form an upper clearance on a side opposite to the bottom surface and form a side clearance between the electrode body and each of the first side surface and the second side surface. The gas discharge valve includes a first discharge valve provided on the first side surface and a second discharge valve provided on the second side surface. At least a portion of an opening of the first discharge valve is located at a region of the first side surface to which the upper clearance is projected. At least a portion of an opening of the second discharge valve is located at a region of the second side surface to which the upper clearance is projected.

In one embodiment, the electrode body is formed by winding, around a winding axis, a sheet-like laminate including a positive electrode and a negative electrode, and the electrode body is accommodated in the inner space to form an upper clearance on a side opposite to the bottom surface and form a side clearance between the electrode body and the side surface. The gas discharge valve includes a first discharge valve and a second discharge valve provided on respective sides of the electrode body along a direction in which the winding axis extends. At least a portion of the opening of the first discharge valve and at least a portion of the opening of the second discharge valve are located at regions of the side surfaces to which the upper clearance is projected.

In one embodiment, the bottom surface of the housing has a substantially rectangular shape.

In one embodiment, the power storage cell includes a lithium ion battery.

A power storage device according to the present disclosure includes: a plurality of power storage cells each of which is the above-described power storage cell, the plurality of power storage cells being arranged in an arrangement direction orthogonal to a direction in which the first discharge valve and the second discharge valve face each other; and a restraining member that restrains the plurality of power storage cells arranged in the arrangement direction.

According to the present disclosure, in the power storage cell and the power storage device, gas can be stably discharged from the housing.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
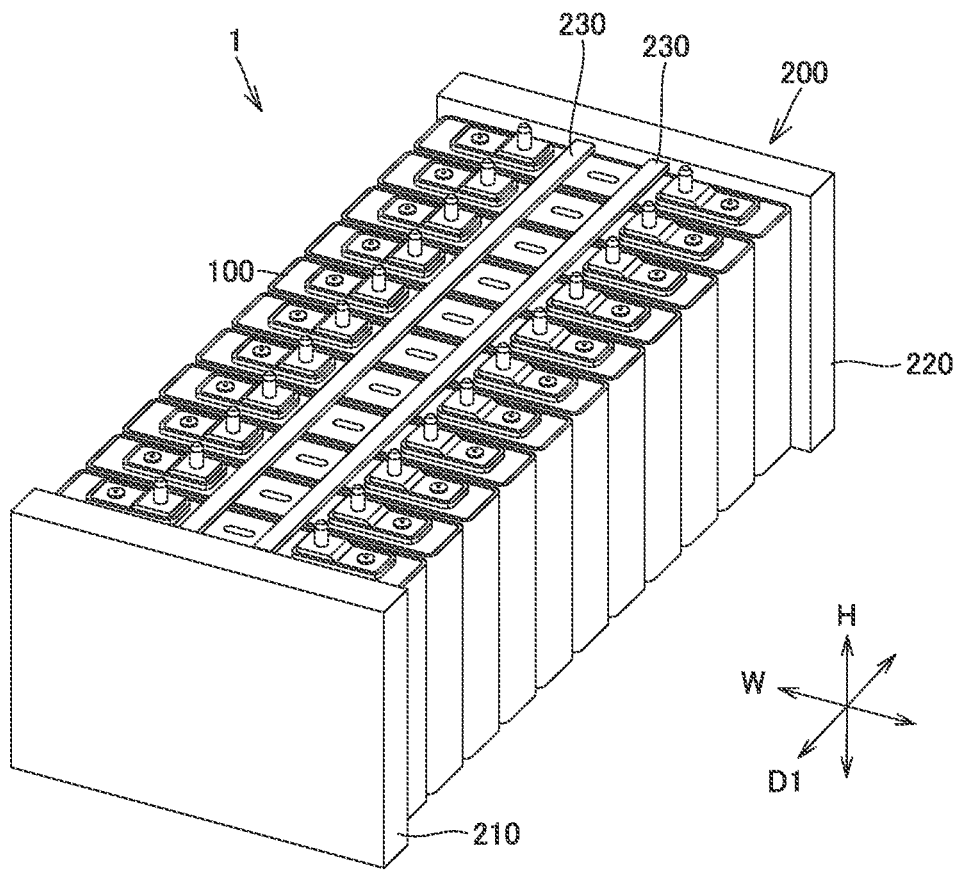
FIG. 1 is a perspective view showing a power storage device.

Hereinafter, embodiments of the present disclosure will be described. The same or corresponding portions are denoted by the same reference numerals, and the description thereof may not be repeated.

In the embodiments described below, when reference is made to the number, the amount, and the like, the scope of the present disclosure is not necessarily limited to the number, the amount, and the like unless otherwise specified. In the following embodiments, each component is not necessarily essential to the present disclosure unless otherwise specified.

FIG. 1 is a perspective view showing a power storage device 1. The electricity storage device 1 includes a plurality of electricity storage cells 100 and a restraining member 200. The plurality of power storage cells 100 are arranged in the arrangement direction D1.

The restraining member 200 includes a constraining plate 210, a restraining plate 220, and a restraining band 230. The constraining plate 210 is arranged at one end of the electricity storage device 1 in the arrangement direction D1, and the constraining plate 220 is arranged at the other end of the electricity storage device 1 in the arrangement direction D1. The restraining band 230 connects the constraining plate 210 and the restraining plate 220 and restrains the constraining plate 210 and the restraining plate 220.

The plurality of electricity storage cells 100 arranged between the constraining plate 210 and the constraining plate 220 are pressed by the constraining plate 210 and the constraining plate 220, and are constrained between the constraining plate 210 and the constraining plate 220.

Figure 2:
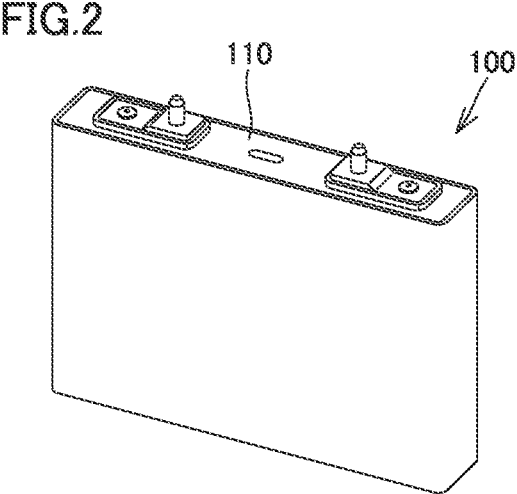
FIG. 2 is a perspective view showing a power storage cell included in the power storage device of FIG. 1.
Figure 3:
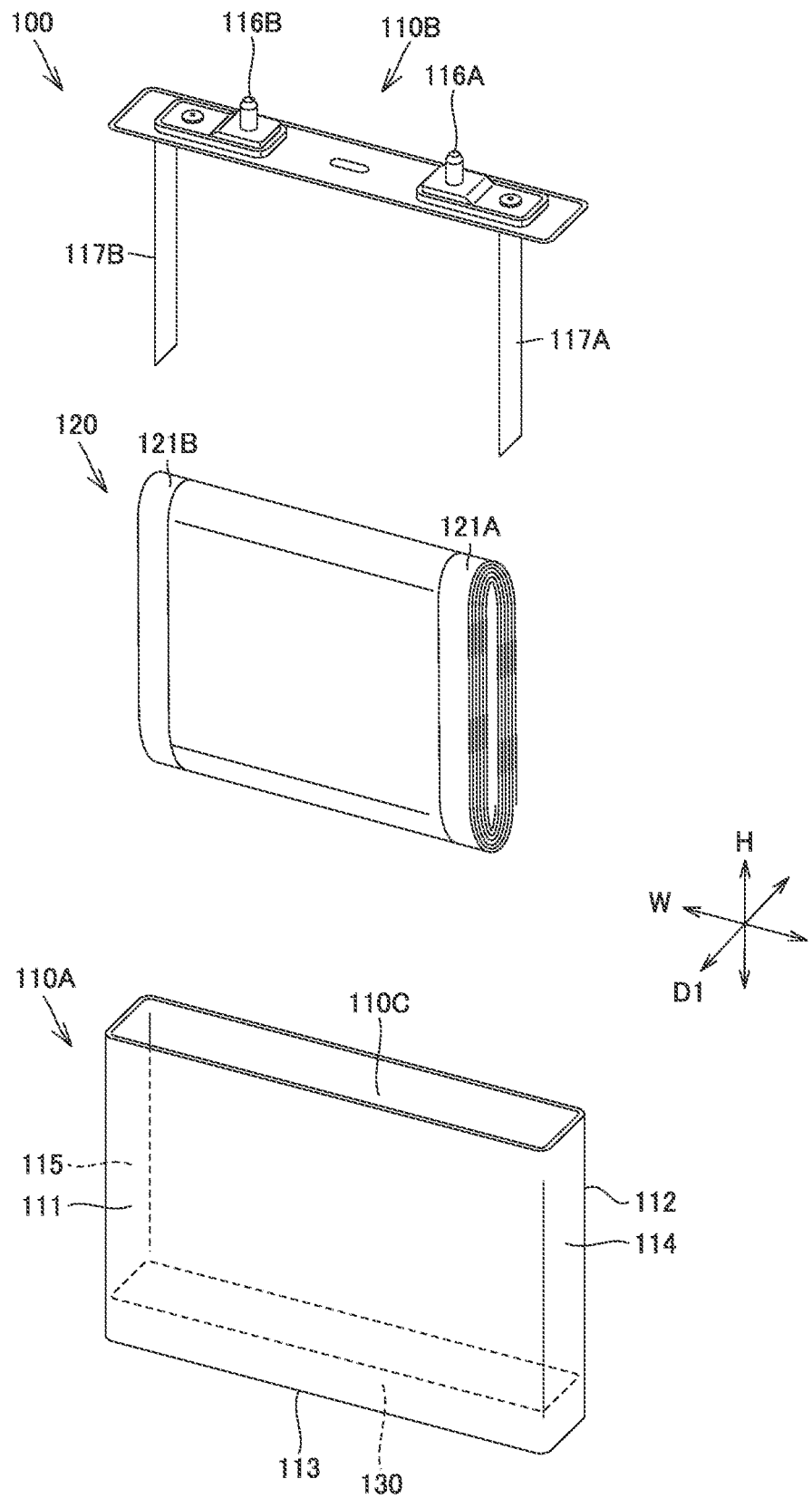
FIG. 3 is an exploded perspective view showing the power storage cell shown in FIG. 2.

FIG. 2 is a perspective view showing the power storage cell 100. FIG. 3 is an exploded perspective view showing the power storage cell 100. As shown in FIGS. 2 and 3, the power storage cell 100 is formed in a flat rectangular parallelepiped shape. The electricity storage cell 100 includes a housing case 110, an electrode body 120, and an electrolytic solution 130.

The accommodation case 110 includes a case main body 110A that opens upward, and a lid 110B assembled to the case main body 110A. The case body 110A and the lid 110B define an inner space 110C of the accommodation case 110.

The case body 110A includes main plates 111 and 112, a bottom plate 113, and end face plates 114 and 115. The main plates 111 and 112 and the end face plates 114 and 115 are formed to extend upward from the peripheral edge portion of the bottom plate 113.

The main plate 111 and the main plate 112 are aligned in the arrangement direction D1 (the lateral direction of the bottom plate 113). The bottom plate 113 has a substantially rectangular shape. The end face plate 114 and the end face plate 115 are aligned in the width direction W (the longitudinal direction of the bottom plate 113).

The lid 110B is formed in a plate shape. On the upper surface of the lid 110B, a positive external terminal 116A and a negative external terminal 116B are arranged at intervals in the width direction W.

A positive collector plate 117A and a negative collector plate 117B are disposed on the lower surface of the lid 110B. The positive collector plate 117A is connected to the positive external terminal 116A, and the negative collector plate 117B is connected to the negative external terminal 116B.

The main plates 111 and 112 face each other along the arrangement direction D1. The bottom plate 113 and the lid 110B face each other along the height direction H. The end face plates 114 and 115 face each other along the width direction W. As shown in FIG. 3, the distance between the end face plates 114 and 115 in the width direction W is larger than the distance between the main plates 111 and 112 in the arrangement direction D1 and the distance between the bottom plate 113 and the lid 110B in the height direction H.

The electrode body 120 includes a positive electrode 121A and a negative electrode 121B. The positive electrode 121A is electrically connected to the positive electrode collector plate 117A, and the negative electrode 121B is electrically connected to the negative electrode collector plate 117B.

The electrode body 120 is formed by winding a laminate sheet obtained by laminating a long sheet-like positive electrode, a long sheet-like negative electrode, and a long sheet-like separator provided between the positive electrode and the negative electrode around an axis in the width direction W and forming the laminate sheet into a flat shape.

The power storage device 1 is typically a lithium ion battery, but the present disclosure is also applicable to a nickel-hydrogen battery. The present disclosure is also applicable to capacitors.

The electrolytic solution 130 may decompose and vaporize to generate gas. When the inside of the accommodation case 110 is filled with the generated gas, the battery internal pressure rises. When the battery internal pressure rises above a predetermined value, it is required to discharge the gas in the accommodation case 110 to the outside of the accommodation case 110.

Figure 4:
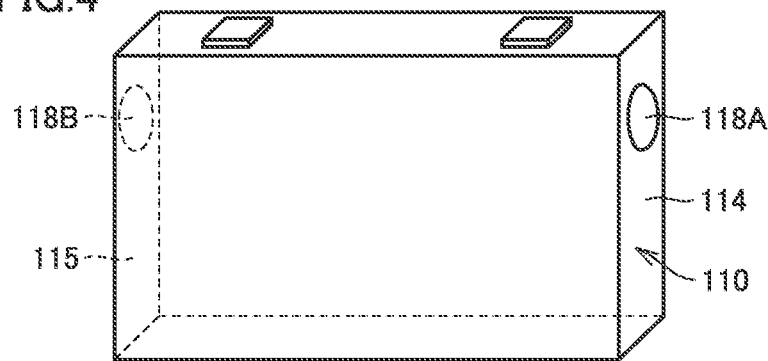
FIG. 4 is a diagram showing an arrangement of gas discharge valves in a power storage cell.

FIG. 4 shows an arrangement of the gas discharge valves 118A and 118B in the power storage cell 100. As shown in FIG. 4, the gas discharge valve 118A (first discharge valve) is provided on the end face plate 114 (first side face), and the gas discharge valve 118B (second discharge valve) is provided on the end face plate 115 (second side face).

Figure 5:
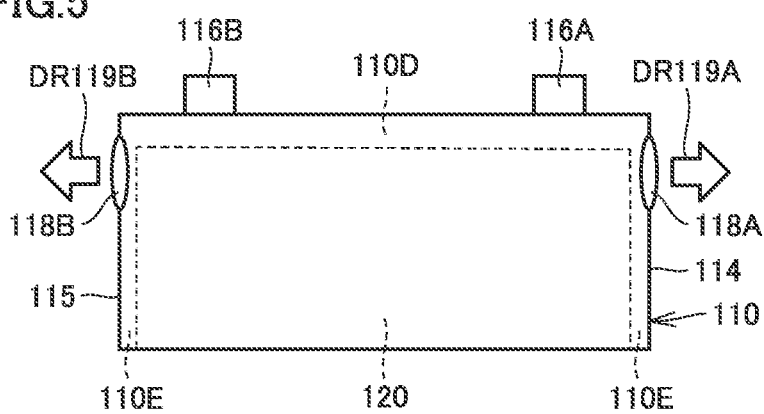
FIGS. 5 and 6 are diagrams showing the positional relationship between the gas discharge valve and the electrode body.
Figure 6:
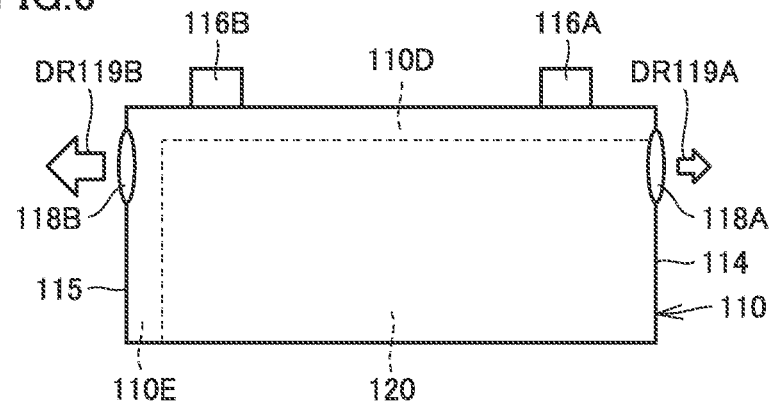

FIGS. 5 and 6 are diagrams showing the positional relationship between the gas discharge valves 118A and 118B and the electrode body 120.

As shown in FIG. 5, the electrode body 120 is accommodated in the inner space 110C such that an upper clearance 110D is formed on the side opposite to the bottom plate 113 (bottom surface) and a side clearance 110E is formed between the electrode body 120 and the end face plates 114 and 115.

When gas is generated in the accommodation case 110 and the internal pressure reaches a predetermined value or more, the gas in the accommodation case 110 is discharged to the outside of the accommodation case 110. The gas is discharged from the gas discharge valves 118A and 118B along the directions of arrows DR119A and DR119B.

As shown in FIG. 6, the electrode body 120 may move from the center in the width direction W toward one side (the end face plate 114 side in the example of FIG. 6) in the housing case 110 due to external impact or the like. At this time, a part of the opening of the gas discharge valve 118A is blocked by the electrode body 120, and the discharge of the gas from the gas discharge valve 118A is partially inhibited.

In recent years, in order to improve the capacity and energy density of lithium ion batteries applied to electric vehicles and the like, electrode materials and structural materials tend to be densely filled in the housing case 110. As a result, there is a high possibility that the electrode body 120 closes the openings of the gas discharge valves 118A and 118B.

However, in the power storage cell 100 according to the present embodiment, since the gas release valve 118B is also provided on the end face plate 115 side, the gas is released from the gas release valve 118B as usual in the state shown in FIG. 6.

Further, in the electricity storage cell 100, a part of the opening of the gas discharge valves 118A and 118B on the inner surface side of the accommodation case 110 overlaps the upper gap 110D. That is, a part of the opening of the gas discharge valves 118A and 118B is located in a region in which the upper gap 110D is projected onto the end face plates 114 and 115.

Therefore, in the state of FIG. 6, the opening of the gas discharge valve 118A is not completely blocked by the electrode body 120. Also in the state of FIG. 6, the gas discharge valve 118A can discharge gas at least partially.

As described above, in the power storage cell 100 according to the present embodiment, even when the electrode body 120 moves in the width direction W, the gas flow path is secured, and the discharge of the gas in the accommodation case 110 is not hindered. Therefore, the battery internal pressure can be easily controlled.

Further, in the power storage cell 100, when the electrode body 120 is positioned at the center in the width direction W, the space (the upper gap 110D and the side gap 110E) is formed in the vicinity of the gas discharge valves 118A and 118B, so that an excessive increase in pressure in the vicinity of the gas discharge valves 118A and 118B is suppressed. As a result, unintended gas discharge by the gas discharge valves 118A and 118B is suppressed. In this sense, the battery internal pressure can be easily controlled in the power storage cell 100.

In the example of FIGS. 5 and 6, the case where a part of the opening of the gas discharge valves 118A and 118B is located in the region where the upper gap 110D is projected on the end face plates 114 and 115 has been described, but the entire opening of the gas discharge valves 118A and 118B may be located in the region where the upper gap 110D is projected on the end face plates 114 and 115.

Figure 7:
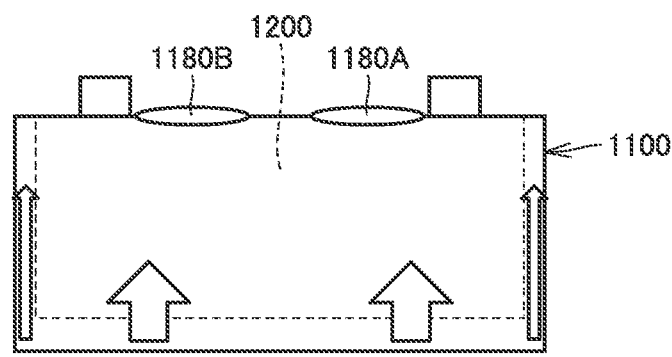
FIG. 7 is a diagram showing an arrangement of gas discharge valves in a power storage cell according to a comparative example.

FIG. 7 is a diagram showing an arrangement of gas discharge valves in a power storage cell according to a comparative example. In FIG. 7, gas discharge valves 1180A and 1180B are provided on the upper surface of the storage case 1100 of the power storage cell.

In the comparative example of FIG. 7, as in the example of FIGS. 5 and 6, when the electrode body 1200 moves in the width direction W, the discharge of gas in the accommodation case 1100 is not hindered. However, in the comparative example of FIG. 7, when the electrode body 1200 rises due to the pressure of the gas generated in the housing case 1100, the openings of the gas discharge valves 1180A and 1180B are blocked, and the discharge of the gas is inhibited.

When the filling rate in the accommodation case 1100 is increased, there is a high possibility that the electrode body 1200 closes the openings of the gas discharge valves 1180A and 1180B.

On the other hand, in the power storage cell 100 according to the present embodiment, since the gas release valves 118A and 118B are provided on the end face plates 114 and 115 located on both sides of the electrode body 120, even if the electrode body 120 is raised in the accommodation case 110, the release of gas from the gas release valves 118A and 118B is less likely to be hindered.

Figure 8:
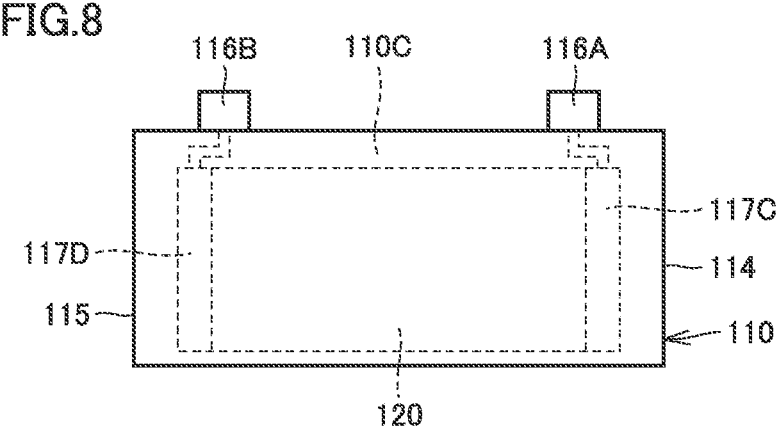
FIGS. 8 and 9 are diagrams showing an example of an electrode body structure in a power storage cell.
Figure 9:
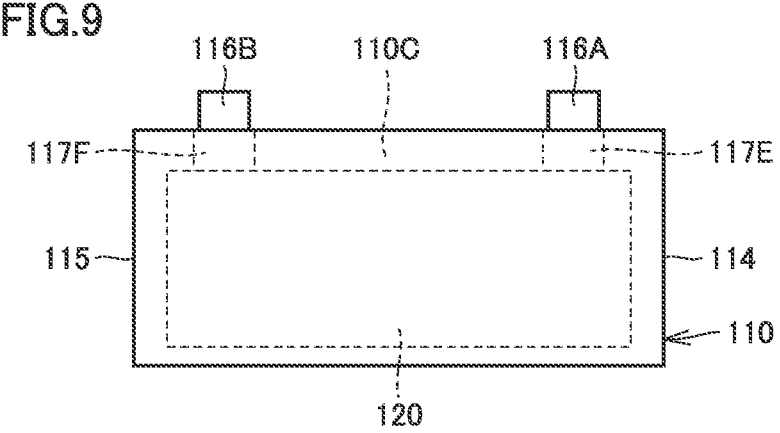

FIGS. 8 and 9 are diagrams showing an example of an electrode body structure in the power storage cell 100. As shown in FIGS. 8 and 9, the electrode body structure including the current collecting portion 117C, 117D, 117E and 117F and the electrode body 120 has a symmetrical shape when viewed from the main plates 111 and 112 side. The current collecting portions 117C and 117D may be provided on the left and right sides of the electrode body 120 as in the example of FIG. 8, or the current collecting portions 117E and 117F may be provided on the upper portion of the electrode body 120 as in the example of FIG. 9.

The above embodiments are summarized as follows. The electricity storage cell 100 according to the present embodiment includes an accommodation case 110 (housing) including a bottom plate 113 (bottom surface) and end face plates 114 and 115 (side surfaces) and defining an inner space 110C, an electrode body 120 accommodated in the inner space 110C of the accommodation case 110, and gas discharge valves 118A and 118B provided in the end face plates 114 and 115 of the accommodation case 110.

The bottom plate 113 of the accommodation case 110 has a relatively large width (first width) along the width direction W (first direction) and a relatively small width (second width) along the arrangement direction D1 (second direction). The end face plate 114 (first side face) and the end face plate 115 (second side face) of the accommodation case 110 are located at both ends in the width direction W, respectively.

The electrode body 120 is formed by winding a sheet-like laminate including a positive electrode and a negative electrode around an axis (winding axis) in the width direction W. The electrode body 120 is accommodated in the inner space 110C in a state in which an upper gap 110D can be formed on the side opposite to the bottom plate 113. The electrode body 120 is accommodated in the inner space 110C in a state in which a side gap 110E can be formed between the electrode body 120 and the end face plates 114 and 115.

The gas discharge valve 118A (first discharge valve) is provided on the end face plate 114, and the gas discharge valve 118B (second discharge valve) is provided on the end face plate 115. The gas discharge valves 118A and 118B are provided on both sides of the electrode body 120 along the width direction W in which the axis around which the electrode body 120 is wound extends. At least a part of the openings of the gas discharge valves 118A and 118B is located in a region in which the upper clearance 110D is projected onto the end face plates 114 and 115.

Thus, even when the electrode body 120 is biased toward the end face plate 114, the gas discharge valve 118B provided in the end face plate 115 discharges gas as usual, and the gas discharge valve 118A provided in the end face plate 114 does not completely block the opening, so that the gas discharge valve 118A maintains the function of at least partially discharging gas. Further, even when the electrode body 120 rises due to the gas pressure in the accommodation case 110, the gas releasing functions of the gas releasing valves 118A and 118B provided in the end face plates 114 and 115 are maintained.

Therefore, in the power storage cell 100 according to the present embodiment, gas discharge from the accommodation case 110 can be performed stably.

In the power storage cell 100, the detailed structure of the gas discharge valves 118A and 118B is not particularly limited, and a general structure can be used as the gas discharge valves 118A and 118B. The gas discharge valves 118A and 118B need only be able to discharge the gas in the accommodation case 110 to the outside of the accommodation case 110 when the pressure in the accommodation case 110 becomes equal to or higher than a predetermined value.

In the present embodiment, the gas discharge valves 118A and 118B are provided at symmetrical positions when viewed from the main plates 111 and 112 side, but the scope of the present disclosure is not limited thereto. For example, the positions of the gas discharge valves 118A and 118B in the height direction H may be slightly different from each other.

Gas discharge valves other than the gas discharge valves 118A and 118B may be added to any position of the end face plates 114 and 115. Gas discharge valves other than the gas discharge valves 118A and 118B may be added to arbitrary positions of the main plates 111 and 112 and the lid 110B.

Although embodiments of the present disclosure have been described, it should be understood that the embodiments disclosed herein are illustrative and not restrictive in all respects. The scope of the present disclosure is indicated by the claims, and all modifications within the meaning and range equivalent to the claims are intended to be included.

What is claimed is:

1. A power storage cell comprising:
a housing including a bottom surface and a side surface and defining an inner space, the housing having a substantially rectangular shape;
an electrode body accommodated in the inner space of the housing; and
a gas discharge valve provided on the side surface of the housing, wherein
the bottom surface of the housing has a first width along a first direction and a second width along a second direction, the second width being smaller than the first width,
the side surface of the housing includes a first side surface and a second side surface that are respectively located at ends of the housing in the first direction,
the electrode body is accommodated in the inner space to form an upper clearance on a side opposite to the bottom surface and form a side clearance between the electrode body and each of the first side surface and the second side surface,
the gas discharge valve includes a first discharge valve provided on the first side surface and a second discharge valve provided on the second side surface,
an entire opening of the first discharge valve is located at a region of the first side surface to which the upper clearance is projected, and the entire opening of the first discharge valve overlaps the upper clearance when viewed along the first direction,
an entire opening of the second discharge valve is located at a region of the second side surface to which the upper clearance is projected, and the entire opening of the second discharge valve overlaps the upper clearance when viewed along the first direction,
the openings of the first discharge valve and the second discharge valve do not overlap the electrode body when viewed along the first direction so that both the first discharge valve and the second discharge valve maintain the function of discharging gas,
the positions of the first discharge valve and the second discharge valve in the height direction are different from each other, and
a third discharge valve different from the first discharge valve and the second discharge valve is provided on a lid of the housing.

2. The power storage cell according to claim 1, wherein the bottom surface of the housing has a substantially rectangular shape.

3. The power storage cell according to claim 1, wherein the power storage cell includes a lithium ion battery.

4. A power storage device comprising:
a plurality of power storage cells each of which is the power storage cell recited in claim 1, the plurality of power storage cells being arranged in an arrangement direction orthogonal to a direction in which the first discharge valve and the second discharge valve face each other; and
a restraining member that restrains the plurality of power storage cells arranged in the arrangement direction.

5. A power storage cell comprising:
a housing including a bottom surface and side surfaces and defining an inner space, the housing having a substantially rectangular shape;
an electrode body accommodated in the inner space of the housing; and
a gas discharge valve provided on each of the side surfaces of the housing, wherein
the electrode body is formed by winding, around a winding axis, a sheet-like laminate including a positive electrode and a negative electrode, and the electrode body is accommodated in the inner space to form an upper clearance on a side opposite to the bottom surface and form a side clearance between the electrode body and the side surface,
the gas discharge valve includes a first discharge valve and a second discharge valve provided on respective sides of the electrode body along a direction in which the winding axis extends,
an entire opening of the first discharge valve and an entire opening of the second discharge valve are located at regions of the side surfaces to which the upper clearance is projected,
the openings of the first discharge valve and the second discharge valve do not overlap the electrode body when viewed along a first direction so that both the first discharge valve and the second discharge valve maintain the function of discharging gas,
the positions of the first discharge valve and the second discharge valve in the height direction are different from each other, and
a third discharge valve different from the first discharge valve and the second discharge valve is provided on a lid of the housing.

6. The power storage cell according to claim 5, wherein the bottom surface of the housing has a substantially rectangular shape.

7. The power storage cell according to claim 5, wherein the power storage cell includes a lithium ion battery.

8. A power storage device comprising:
a plurality of power storage cells each of which is the power storage cell recited in claim 5, the plurality of power storage cells being arranged in an arrangement direction orthogonal to a direction in which the first discharge valve and the second discharge valve face each other; and
a restraining member that restrains the plurality of power storage cells arranged in the arrangement direction.

* * * * *